May 8, 1923.
W. L. DODGE
ENVELOPE
Filed Jan. 23, 1920
1,454,043
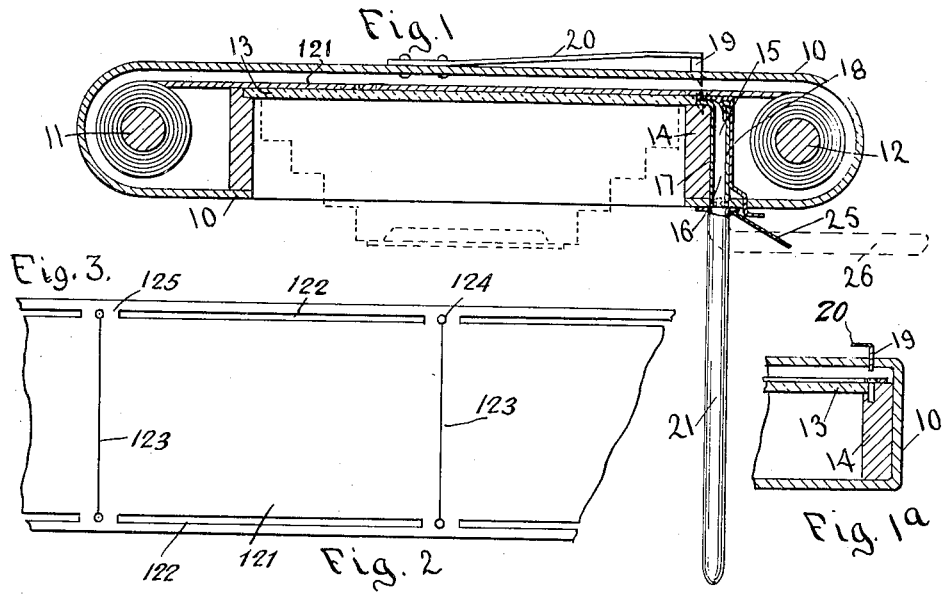
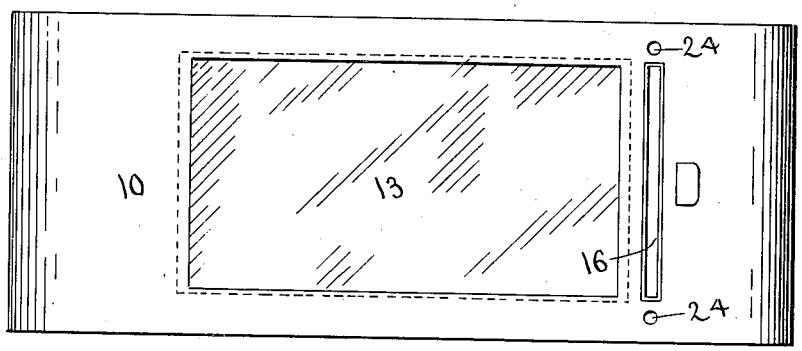
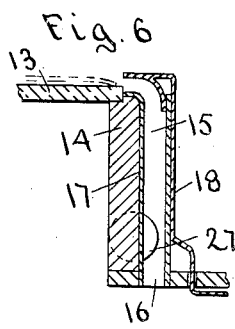
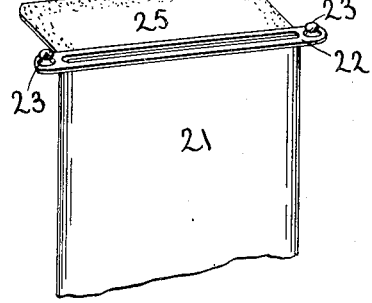
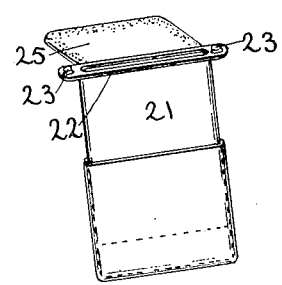
INVENTOR
William L. Dodge Patented May 8, 1923.

1,454,043

UNITED STATES PATENT OFFICE.

WILLIAM L. DODGE, OF DOVER, NEW HAMPSHIRE.

ENVELOPE.

Application filed January 23, 1920. Serial No. 353,454.

*To all whom it may concern:*

Be it known that I, WILLIAM L. DODGE, a citizen of the United States, residing at Dover, in the county of Strafford, in the State of New Hampshire, have invented a certain new and useful Improvement in Envelopes, of which the following is a specification, reference being had to the accompanying drawings.

The object of this invention is to provide a novel construction of envelope, or receiver, for use mainly in transferring sensitized film from cameras in daylight and, more particularly, for transferring from such cameras exposed portions of strip films which it may be desired to develop immediately, that is to say, without waiting until the entire strip of film has been exposed.

For the purpose of explaining my invention clearly I have provided the annexed drawings, in which the Figure 1 is a longitudinal, sectional, view of a camera constructed for use with envelopes of my present improved form. Figure 1ª is a fragmentary cross section in the transverse plane of the film-severing knives. Figure 2 is a front elevation of said camera with the lens carrier and bellows omitted, showing particularly the throat through which the exposed section of film may be discharged into said envelope and, in Figure 3, I have shown a portion of a strip film in which special provision is made for selectively removing an exposed section of the film. Figure 4 is a perspective view of the major portion of an envelope embodying my present improvement and Figure 5 is a perspective view of said envelope as it appears when telescoped and ready for attachment to the camera.

In these drawings the numeral 10 indicates a camera of the type in which a strip of sensitized film is used and the numerals 11 and 12 denote, respectively, the take up and delivery rolls or spools on which the film 121 is mounted. 13 denotes a sheet of glass located between the film and lens and serving as a flat field which keeps the film smooth as the latter is fed along, and said glass also serves to prevent dust from reaching the film and lens. The glass 13 is supported on and by a partition 14 which latter is formed with a slit 15 that is located at or near the rear end of the last exposed section of film, which slit may serve as a throat into which the said rear end may be directed and guided to a like slit 16 in the outer wall of the camera whence the film is finally discharged from the camera. I, preferably, line the described throat with a sheet metal tube 17 and I mount slidably upon one wall of said tube a slide 18 whose upper end portion is bent laterally and is located in the same plane as the glass 13 when the slide 18 is in its lowest position.

In Figure 6 the slide is shown in its elevated position, thereby breaking the continuity of the plate upon which the film slides and providing an opening in which the rear end of the severed film section readily enters, as the film passes along, and is finally guided downward through the throat; the severed section having a tendency to curl downward because of its having been coiled for some time previous on the delivery spool.

The film is provided with longitudinal slits 122 near and parallel, or approximately so, to the lateral edges, and with transverse cuts or slits 123, which extend without interruption from end to end but terminate within the side edges. These transverse slits preferably run into perforations 124 of a diameter preferably equal to the width of the slits 122. Between the opposite ends of each slit 122 and the adjacent perforations 124 are left uncut parts 125 of the film. The areas included within the slits 122 and the transverse cuts 123 are the fields of exposure of the film, which are united integrally with the edge portions by the parts 125, but when these latter parts are cut the interior sections are wholly severed from the balance of the strip, leaving narrow bands at the edges. Thus an exposed section of film may be severed and removed from the camera without requiring the removal of the entire film.

In order to completely sever the exposed film section from the strip I may provide knives 19 which are carried by the free end portion of a spring plate 20, which plate may be operated by pressure from the outside of the camera box.

My improved receiver for the ejected film section consists of an envelope 21 whose open end is placed in register with the throat opening 16 and clamped in its operative position until said ejected film has been transferred from the camera to the envelope. In order to thus clamp the envelope to the camera I have provided a slotted plate 22 which is secured to the open end of the envelope and is provided with sockets 23 of the "glove fastener" type which are adapted to engage studs 24 on the camera box and thus attach the envelope temporarily to said box. The envelope is provided with a gummed flap 25 by means of which the envelope may be sealed after having been detached from the camera.

For the purpose of excluding light from the envelope while the latter is being detached from the camera the flexible envelope may be bent laterally, just below plate 22, as indicated by dotted lines 26 in Figure 1, and clamped firmly together until such time as the flap 25 has been folded over the envelope opening and sealed.

In Figure 5 I have illustrated the envelope as having been telescoped and thereby shortened to such an extent that it is then considerably shorter than the film section which it is to receive. As the end of the film passes into the envelope, and abuts the bottom of the envelope, the operator may then grasp the lower end of the envelope so as to include the film end and, by pulling the combined envelope and film downward so as to extend the envelope to its full length, the film is, by the same movement, drawn out of the camera and into the envelope. If desired, a feed roll 27 may be provided in order to aid in feeding the film section in its passage through the throat and into the envelope. Such feed roll may be rotated by an external knob or handle at one end, preferably of the same general character as the handles commonly applied to the take-up rolls of strip-film cameras.

By the use of my described envelope or receiver it is both feasible and easy to remove from the camera one or more exposed film sections without resorting to a dark room and without interfering with the feeding and exposure of the remainder of the strip of film.

Having thus described my invention, I claim:—

1. As a new article of manufacture a film receiver for use with photographic cameras consisting of an envelope of flexible and tough material having a transversely extending fold, whereby one part of the envelope is telescopically contained within another part of the envelope.

2. A film receiver adapted to be used in connection with photographic cameras to receive and protect from light exposure a film section discharged therefrom, consisting of an envelope open at one end and closed at the other end, the sides of said envelope being transversely folded to cause the parts of the walls adjacent to the closed end of the envelope to surround in a telescopic manner the adjacent parts of said walls.

3. A flexible envelope of opaque material having an opening at one end, and a flat plate having an interior slot and provided with means for making detachable connection flat against the outer surface of the camera, the walls of the envelope at the mouth end of the latter being permanently secured to said plate, surrounding the outlines of the slot therein.

4. The combination with a camera of the strip-film type having a slot opening through its outer wall for emission of a section of film, of an envelope for receiving such ejected section, said envelope having flexible opaque walls and a mouth plate to which such walls at one end are united, the walls at the other end of the envelope being joined together; the plate having a slot opening between such walls, and the plate and camera having complemental fastening means constructed and arranged to secure the plate in a detachable manner to the camera with its slot in register with the aforesaid emission slot of the camera.

WILLIAM L. DODGE.